United States Patent
Liu et al.

(10) Patent No.: US 11,149,361 B1
(45) Date of Patent: Oct. 19, 2021

(54) PREPARATION METHODS OF HIGH MODULUS CARBON FIBER (HMCF) AND PRECURSOR (MESOPHASE PITCH (MP)) THEREOF

(71) Applicant: China University of Petroleum, Qingdao (CN)

(72) Inventors: Dong Liu, Qingdao (CN); Xin Gong, Qingdao (CN); Bin Lou, Qingdao (CN); Jun Li, Qingdao (CN); Zhihao Li, Qingdao (CN); Nan Shi, Qingdao (CN); Fushan Wen, Qingdao (CN); Hui Du, Qingdao (CN); Zhaojun Chen, Qingdao (CN); Changlong Yin, Qingdao (CN); Xiujie Yang, Qingdao (CN); Luning Chai, Qingdao (CN); Zhichen Zhang, Qingdao (CN); Enqiang Yu, Qingdao (CN); Yu'e Fu, Qingdao (CN); Huizhi Yuan, Qingdao (CN); Jianguo Zhang, Qingdao (CN); Zhiqing Ma, Qingdao (CN); Chong Jiao, Qingdao (CN); Yonggang Cao, Qingdao (CN)

(73) Assignee: CHINA UNIVERSITY OF PETROLEUM, Qingdao (CN)

( * ) Notice: Subject to any disclaimer, the term of this patent is extended or adjusted under 35 U.S.C. 154(b) by 0 days.

(21) Appl. No.: 17/315,390

(22) Filed: May 10, 2021

(30) Foreign Application Priority Data

May 22, 2020 (CN) .......................... 202010439569.3

(51) Int. Cl.
| | |
|---|---|
| *B01D 15/34* | (2006.01) |
| *B01D 15/36* | (2006.01) |
| *B01J 20/26* | (2006.01) |
| *B01J 20/28* | (2006.01) |
| *D01F 9/15* | (2006.01) |
| *D01F 9/155* | (2006.01) |
| *C10C 3/08* | (2006.01) |
| *B01D 15/18* | (2006.01) |

(52) U.S. Cl.
CPC ......... *D01F 9/155* (2013.01); *B01D 15/1835* (2013.01); *B01D 15/34* (2013.01); *B01D 15/362* (2013.01); *B01D 15/363* (2013.01); *B01J 20/261* (2013.01); *B01J 20/28047* (2013.01); *B01J 20/28054* (2013.01); *C10C 3/08* (2013.01); *D01F 9/15* (2013.01); *D10B 2101/12* (2013.01)

(58) Field of Classification Search
CPC D01F 9/155; D01F 9/15; B01D 15/34; B01D 15/362; B01D 15/363; B01J 20/261; B01J 20/28047; B01J 20/28054; C10C 3/08; D10B 2101/12
See application file for complete search history.

(56) References Cited

U.S. PATENT DOCUMENTS

| | | | | |
|---|---|---|---|---|
| 3,787,541 A | * | 1/1974 | Whittaker | D01F 9/145 |
| | | | | 423/447.1 |
| 3,976,729 A | * | 8/1976 | Lewis | D01F 9/322 |
| | | | | 264/29.7 |
| 4,209,500 A | * | 6/1980 | Chwastiak | C10C 3/002 |
| | | | | 208/22 |

FOREIGN PATENT DOCUMENTS

| | | |
|---|---|---|
| CN | 101762666 A | 6/2010 |
| CN | 104151532 A | 11/2014 |
| CN | 104195676 A | 12/2014 |
| CN | 104418605 A | 3/2015 |
| CN | 107189802 A | 9/2017 |
| CN | 107312561 A | 11/2017 |
| CN | 108611113 A | 10/2018 |
| CN | 108728147 A | 11/2018 |
| CN | 109004210 A | 12/2018 |
| CN | 109563414 A | 4/2019 |
| CN | 110041952 A | 7/2019 |
| JP | S59106518 A | 6/1984 |
| RU | 2668444 C1 | 10/2018 |

OTHER PUBLICATIONS

Matsumoto, T., "Mesophase pitch and its carbon fibers", Pure & Appl. Chem., vol. 57, No. 11, pp. 1553-1562. (Year: 1985).*

(Continued)

*Primary Examiner* — Benjamin L Lebron
(74) *Attorney, Agent, or Firm* — Bayramoglu Law Offices LLC

(57) ABSTRACT

Preparation methods of a high modulus carbon fiber (HMCF) and a precursor (mesophase pitch (MP)) thereof are provided. The preparation method of MP includes: separating components with a molecular weight distribution (MWD) of 400 to 1,000 from a heavy oil raw material through size-exclusion chromatography (SEC); subjecting the components to ion-exchange chromatography (IEC) to obtain modified feedstock oil, where the components are passed through macroporous cation-exchange and anion-exchange resins in sequence to remove acidic and alkaline components; and subjecting the modified feedstock oil to thermal polycondensation and carbonization to obtain high-quality MP with prominent spinnability. With high mesophase content, low softening point, low viscosity, and prominent meltability and spinnability, the obtained MP is a high-quality raw material for preparing HMCFs. The obtained MP can be subjected to melt spinning, pre-oxidation, carbonization, and graphitization to obtain an MP-based HMCF.

20 Claims, No Drawings

(56) References Cited

OTHER PUBLICATIONS

Boenigk, W., et al., "Structural features and mesophase formation of coal-tar pitch fractions obtained by preparative size exclusion chromatography", Fuel, vol. 69, October, pp. 1226-1232. (Year: 1990).*

Xiaoxue Liu, Ordered Mesoporous Carbons: Preparation and Capacitance Properties, Masteral Dissertation, 2009, pp. 1-67, Dalian University of Technology.

* cited by examiner

PREPARATION METHODS OF HIGH MODULUS CARBON FIBER (HMCF) AND PRECURSOR (MESOPHASE PITCH (MP)) THEREOF

CROSS REFERENCE TO THE RELATED APPLICATIONS

This application is based upon and claims priority to Chinese Patent Application No. 202010439569.3, filed on May 22, 2020, the entire contents of which are incorporated herein by reference.

TECHNICAL FIELD

The present invention belongs to the technical fields of petroleum refinery and the preparation of new advanced carbon materials, and specifically relates to preparation methods of a high modulus carbon fiber (HMCF) and a precursor (mesophase pitch (MP)) thereof.

BACKGROUND

Carbon fiber is a microcrystalline graphite material. It can be obtained by stacking organic fibers such as flake graphite microcrystals in an axial direction of the fibers and subjecting them to carbonization and graphitization. Carbon fiber is a new high-strength and high-modulus fiber material with a carbon content of more than 95%. Carbon fiber material features excellent mechanical properties, a tensile strength of more than 3,500 MPa, low weight, low density, strong corrosion and wear resistance, high electrical and thermal conductivity, and the like. Therefore, it is widely used in ultra-high thermal conduction materials, aircraft manufacturing, new building reinforcement materials, automotive component materials, sporting goods, wind power generation, and other fields.

The research on pitch-based carbon fiber began in the late 1950s, and pitch-based carbon fiber was successfully developed by Gunma University in Japan in the early 1960s and industrialized in Japan in the late 1960s. The United States started the industrial production of pitch-based carbon fiber in the 1980s. Generally, pitch-based carbon fiber production capacity on a global scale is relatively small. Although pitch-based carbon fiber is an older established technology, most manufacturers of high-performance pitch-based carbon fiber are under construction. China started the research and development on pitch-based carbon fiber relatively early, but still lags behind when compared with other industrialized nations. In recent years, carbon fiber output in China has increased, but it is far from meeting demand. In addition, pitch-based carbon fiber has substantial marketability due to its low cost and relatively high price. Therefore, pitch-based carbon fiber has a promising future.

As a precursor material of pitch-based carbon fibers, mesophase pitch (MP) is a nematic liquid crystal substance composed of various flat disc-shaped fused-ring aromatic hydrocarbons with an average relative molecular mass of about 2,000. MP has characteristics of liquid crystal, namely, both liquid form and optical anisotropy. With low preparation cost, high oxidation activity, and high carbon purity, MP is a high-quality precursor for preparing high-performance carbon materials.

MP can be prepared through a one-step thermal polycondensation method, a neomesophase method, a catalytic polycondensation method, a dormant mesophase method, and so on. The one-step thermal polycondensation method is simple and convenient. The neomesophase method is relatively complicated and has a low MP yield. Catalysts commonly used in the catalytic polycondensation method include $AlCl_3$ and $HF/BF_3$, where, $AlCl_3$ cannot be separated from a reaction system after the reaction is completed, and $HF/BF_3$ results in great corrosion to a reactor. Finally, the dormant mesophase method requires difficult hydrogenation, high cost, and complicated procedures.

As an example, Chinese patent CN201410395160.0 discloses a preparation method of MP for carbon fibers with high modulus and high thermal conductivity, where, a naphthalene compound such as methyl naphthalene is used as a raw material and hydrogen fluoride-boron trifluoride is used as a catalyst. A corresponding product is obtained by controlling a catalyst amount, polymerization conditions, and separation conditions of low-boiling-point products. As the raw material is limited and expensive, the method is not suitable for large-scale production.

Chinese patents CN201710580222.9 and CN201710580091.4 provide preparation methods of petroleum-based MP. The catalytic cracking slurry oil of naphthenic crude oil is subjected to vacuum distillation, and a distillate with a given boiling point is collected as a raw material and then subjected to high-pressure thermal polycondensation to obtain petroleum pitch. Then, a hydrogen donor is added for reaction to obtain hydrogenated pitch; and finally a co-carbonization additive is added for reaction to obtain high-quality MP, which has a high anisotropic structure content (>98%), a low softening point (230° C. to 270° C.), and prominent spinning performance and is an excellent precursor for preparing HMCFs. However, the method requires a complicated process and strict control on raw materials and reaction parameters, and yield an MP product that generally has a high softening point.

Chinese patents CN201810382792.1 and CN201810372899.8 provide preparation methods of an MP and a carbon fiber. Before catalytic polycondensation, a raw material is subjected to the pretreatment of short-term high-temperature pyrolysis or air blowing oxidation to obtain a modified raw material. The modified raw material is mixed with $ZrO_2$ (a catalyst) to prepare an MP; and the resultant MP is melt spun to prepare an HMCF. However, the pretreatment process is complicated and requires the consumption of substantial energy.

SUMMARY

The present disclosure is intended to overcome the shortcomings in the prior art and provide preparation methods of a high-quality spinnable MP and an HMCF. In the methods, heavy oil (a raw material) is pretreated by size-exclusion chromatography (SEC) and ion-exchange chromatography (IEC) and then subjected to one-step thermal polycondensation and carbonization to obtain the MP. Then the MP is melt spun to obtain the pitch-based HMCF. The present disclosure improves a pretreatment method, expands a source of raw materials, and optimizes a production process.

In order to achieve the above objective, the present disclosure provides preparation methods of a pitch-based HMCF and a precursor (MP) thereof. Therefore, one of the objectives of the present disclosure is to provide a preparation method of MP, including the following steps:

(1) separating components with a molecular weight of 400 to 1,000 from a heavy oil raw material through SEC;

(2) subjecting the components obtained in step (1) to IEC, where, the components are passed through a cation-exchange resin and an anion-exchange resin in sequence to obtain modified feedstock oil; and (3) subjecting the modified feedstock oil obtained in step (2) to thermal polycondensation and carbonization to obtain the MP.

Further, the heavy oil raw material may be one or more of petroleum atmospheric residue, petroleum vacuum residue, petroleum heavy distillate oil, medium- and low-temperature coal tar heavy components, high-temperature coal tar distillate, catalytic cracking slurry oil, hydrocracking tail oil, and ethylene tar (ET). The heavy oil raw material has a high density, a low hydrogen-to-carbon ratio, and an aromatic hydrocarbon content of 25 w % to 55 w % (including various aromatic hydrocarbons that most have 3 to 4 aromatic rings).

Further, a packing material used for the SEC may be an organogel, and the organogel may be one of polystyrene (PS), polyvinyl acetate (PVA), cross-linked dextran, and cross-linked polyacrylamide (CL-PAM), and preferably PS. A flushing agent used for the SEC may be one of hexane, tetrahydrofuran (THF), dichloromethane (DCM), dioxane, cyclohexane, and dichloroethane (DCE), and preferably THF; the SEC may be conducted at a pore size of 500 Å to 1,000 Å; and a gel column may have a diameter of 50 mm to 100 mm and a height of 800 mm to 1,000 mm.

Further, the resins used for the IEC may be one or more of PS, polyethylene (PE), polymethyl methacrylate (PMMA), and styrene-diethylene copolymer, and preferably styrene-diethylene copolymer; the cation-exchange resin may be introduced with sulfonyl or carboxyl, and preferably sulfonyl. The anion-exchange resin may be introduced with quaternary amino or tertiary amino, and preferably quaternary amino; a packed column used for the IEC may have a diameter of 10 mm to 20 mm and a length of 500 mm to 1,000 mm. The modified feedstock oil may have a molecular weight distribution (MWD) of 400 to 1,000, an N content of less than 0.5%, and an S content of less than 0.3%.

Furthermore, the components obtained in step (1) are passed through a macroporous cation-exchange resin, and effluent oil is collected and passed through a macroporous anion-exchange resin; and effluent oil is collected, and the flushing agent is distilled out to obtain modified feedstock oil with a narrow MWD and a low heteroatom content. Preferably, the components obtained in step (1) may specifically be passed through a macroporous cation-exchange resin (introduced with sulfonyl) and a macroporous anion-exchange resin (introduced with quaternary amino) that are based on a skeleton of styrene-diethylene copolymer in sequence.

Further, the thermal polycondensation may be conducted as follows: adding the modified feedstock oil to a high-pressure reactor, and subjecting the oil to thermal treatment for 1 h to 15 h in an inert gas or nitrogen atmosphere under the following conditions to obtain high-quality MP with a low softening point and a high mesophase content: reaction temperature: 360° C. to 480° C., reaction pressure: 0 MPa to 10 MPa, and uniform stirring.

Another objective of the present disclosure is to provide MP prepared by the above method.

Another objective of the present disclosure is to provide a preparation method of HMCF, including: subjecting the MP prepared by the above method to melt spinning, pre-oxidation, carbonization, and graphitization to obtain MP-based HMCF.

The present disclosure also provides use of the MP prepared by the above method in the preparation of high-performance carbon materials, and the high-performance carbon materials include HMCFs, mesocarbon microbeads (MCMBs), anode materials for lithium-ion secondary batteries, MP-based carbon foam, needle coke, and high-density and high-strength C/C composite materials, and preferably include HMCFs or needle coke.

The present disclosure adopts a combined process of SEC and IEC pretreatment and high-pressure thermal polycondensation. The SEC is conducted to remove hydrocarbons with small and large molecular weights in the raw material, thus narrowing an MWD of the reaction raw material and avoiding excessive carbonization of large molecules and incomplete polycondensation of small molecules during a reaction process under the same reaction time, pressure, and temperature. The molecular weight is controlled at 400 to 1,000. The uniformity of the reaction raw material is controlled at a molecular scale. The IEC is conducted to remove acidic and alkaline components in the raw material. The acidic components are mostly oxygen-containing compounds, and the alkaline components are mainly nitrogen-containing compounds. Aromatic compounds with oxygen, sulfur, nitrogen, and other heteroatoms have bond energy much lower than the C—C bond energy and C—H bond energy, show relatively-high reaction activity, and are susceptible to chain breakage at a high temperature, so that condensed aromatic molecules with poor flatness are formed due to vigorous reaction and excessive condensation, which is not conducive to the orderly packing of mesophase molecules and the formation of high-quality spinnable MP and easily results in the formation of mosaic MP. Therefore, removing acidic and alkaline components from the heavy oil raw material is of great significance. In addition, many sulfur- and nitrogen-containing compounds in green coke will escape during a high-temperature calcination process, leading to many defects and cracks in a carbon material. Therefore, it is particularly important to remove acidic and alkaline components from the heavy oil raw material.

The MP prepared by the present disclosure has a softening point of 230° C. to 350° C., a mesophase content >98%, an H/C ratio of 0.45 to 0.60, and a carbon residue of 80% to 85%. Moreover, the MP has high purity, aromaticity, and orientation degree, and is an excellent precursor for preparing HMCFs. A fiber is formed through a melt spinning process. Through a spinneret, mesophase molecules are preferably oriented, and the molecules are oriented and arranged in a direction parallel to a fiber axis. Then the fiber is further subjected to pre-oxidation, carbonization, and graphitization to obtain a pitch-based HMCF. The carbon fiber prepared in the present disclosure has high modulus (>410 GPa), high tensile strength (>2.2 GPa), high elongation (>1.3%), and other prominent properties.

Compared with the prior art, the present disclosure has the following beneficial effects:

(1) The present disclosure involves a raw material with abundant sources, low cost, simple operation process, low energy consumption, reasonable design, simple production process, short reaction time, and low requirements on equipment, and is easily industrialized.

(2) In the method, the SEC and IEC can effectively improve the MWD, composition distribution, and element distribution of the raw material, that is, light components that are not conducive to polycondensation and macromolecular components and heteroatom-containing components that are prone to excessive carbonization are removed; and this pretreatment method is combined with high-pressure thermal polycondensation, that is, MP with excellent properties can be prepared from a raw material with uniform molecular weights through polycondensation. The obtained MP has a high mesophase content, a low softening point, a low viscosity, and prominent meltability and spinnability, and is a high-quality raw material for preparing HMCFs.

DETAILED DESCRIPTION OF THE EMBODIMENTS

The method for preparing MP (precursor) and pitch-based HMCF using heavy oil as a raw material provided in the present disclosure is further described below with reference to the following examples.

At present, most of pitch precursors used in the production of carbon fibers are a mixture of fused-ring aromatic compounds and heterocyclic compounds with alkyl side chains, which has an extremely-complicated structure and chemical composition. A by-product pitch obtained from the petroleum industry and coal tar process has a relative molecular mass of 200 to 800, a carbon content higher than 80%, and a softening point lower than 120° C. Therefore, the pitch, before being used for carbon fiber production, must be prepared into pitch with a softening point above 250° C. by modulation and modification.

In order to achieve the purpose of preparing high-performance carbon fibers, the raw material MP should strictly meet the following conditions: (1) low ash, metal ion, and heteroatom contents; (2) mesophase content: 98% to 100%; (3) softening point: 170° C. to 350° C.; (4) low viscosity at a spinning temperature, which hardly changes with temperature; (5) prominent spinnability and thermal stability; and (6) high oxidation activity and carbon yield rate. The quality of MP strongly depends on the initial raw materials and specific preparation conditions. Therefore, the present disclosure adopts a combined process of SEC and IEC pretreatment and high-pressure thermal polycondensation for the first time to provide preparation methods of a pitch-based HMCF and a precursor (MP) thereof.

In one or more examples of this implementation, a more specific technical solution is provided, and preparation methods of the MP and HMCF include the following specific steps:

a given mass of a heavy oil raw material is taken and prepared into a solution with a mass fraction of 5% using a flushing agent, the solution is added to a chromatographic column packed with PS for SEC separation, and the top of the column is pressurized to obtain effluent oil, where, a gel column used for the SEC has a diameter of 50 mm to 100 mm and a height of 800 mm to 1,000 mm and the packing material has a pore size of 500 Å to 1,000 Å; the effluent oil is passed through a macroporous cation-exchange resin (introduced with sulfonyl) and a macroporous anion-exchange resin (introduced with quaternary amino) that are based on a skeleton of styrene-diethylene copolymer in sequence for IEC separation, and effluent oil is collected, where, a packed column used for the IEC has a diameter of 10 mm to 20 mm and a height of 500 mm to 1,000 mm;

the effluent oil obtained above is added to a high-pressure reactor, nitrogen replacement is conducted 3 times and then nitrogen is introduced to increase a pressure to 0 MPa to 10 MPa, a temperature is raised to 360° C. to 480° C., and then thermal treatment is conducted for 1 h to 15 h under uniform stirring to obtain high-quality spinnable MP, where, the MP has wide-watershed linear optical anisotropy, a softening point of 230° C. to 350° C., a mesophase content >98%, an H/C ratio of 0.45 to 0.60, and a carbon residue of 80% to 85%; and the obtained MP is subjected to melt spinning, preoxidation, carbonization, and graphitization to obtain HMCF, where, the HMCF has high modulus (>410 GPa), high tensile strength (>2.2 GPa), and other prominent properties.

For the MP, the optical structure and content are observed by a polarizing microscope; the softening point is measured by the conventional needle penetration method; H/C is measured by an element analyzer; the carbon residue is measured by the traditional electric furnace method (SH/T0170-92); and the carbon fiber modulus is measured by a Shimadzu AG-IS (1 kN) universal testing machine (UTM).

In order to make the technical solutions of the present disclosure more comprehensible to those skilled in the art, the technical solutions of the present disclosure are described in detail below with reference to specific examples.

Example 1

(1) 20 g of catalytic cracking slurry oil was taken and prepared into a solution with a mass fraction of 5% using THF as a solvent, the solution was added to a chromatographic column packed with PS, and the top of the column was pressurized to obtain effluent oil, where, a gel column had a diameter of 50 mm to 100 mm and a height of 800 mm to 1,000 mm and the packing material had a pore size of 500 Å to 1,000 Å. The effluent oil was added to a chromatographic column packed with a cation-exchange resin (with styrene-diethylene copolymer as a skeleton and introduced with sulfonyl) and an anion-exchange resin (with styrene-diethylene copolymer as a skeleton and introduced with quaternary amino), and effluent oil was collected, where, a packed column had a diameter of 10 mm to 20 mm and a height of 500 mm to 1,000 mm. The effluent oil was added to a high-pressure reactor, nitrogen replacement was conducted 3 times and then nitrogen was introduced to increase a pressure to 4 MPa, a temperature was raised to 430° C., and then thermal treatment was conducted for 9 h under uniform stirring to obtain an MP with 99% wide-watershed linear optical anisotropy (softening point: 300° C., H/C: 0.49, and carbon residue: 83.0%), where, gas was produced during the reaction, the pressure in the reactor remained stable, and the pressure was released and the temperature was slowly reduced after the reaction was completed. (2) The MP was subjected to melt spinning, pre-oxidation, carbonization, and graphitization to obtain an HMCF (418 GPa).

Example 2

(1) 20 g of atmospheric residue was taken and prepared into a solution with a mass fraction of 5% using cyclohexane as a solvent, the solution was added to a chromatographic column packed with PS, and the top of the column was pressurized to obtain effluent oil, where, a gel column had a diameter of 50 mm to 100 mm and a height of 800 mm to 1,000 mm and the packing material had a pore size of 500 Å to 1,000 Å. The effluent oil was added to a chromatographic column packed with a cation-exchange resin (with PS as a skeleton and introduced with sulfonyl) and an anion-exchange resin (with PS as a skeleton and introduced with quaternary amino), and effluent oil was collected, where, a gel column had a diameter of 10 mm to 20 mm and a height of 500 mm to 1,000 mm. The effluent oil was added to a high-pressure reactor, nitrogen replacement was conducted 3 times and then nitrogen was introduced to increase a pressure to 5 MPa, a temperature was raised to 440° C., and then thermal treatment was conducted for 8 h under uniform stirring to obtain an MP with 99% wide-watershed linear optical anisotropy (softening point: 260° C., H/C: 0.54, and carbon residue: 80.93%), where, gas was produced during the reaction, the pressure in the reactor remained stable, and the pressure was released and the temperature was slowly reduced after the reaction was completed. (2) The MP was subjected to melt spinning, pre-oxidation, carbonization, and graphitization to obtain an HMCF (414 GPa).

Example 3

(1) 20 g of vacuum residue was taken and prepared into a solution with a mass fraction of 5% using DCM as a solvent, the solution was added to a chromatographic column packed with PVA, and the top of the column was pressurized to obtain effluent oil, where, a gel column had a diameter of 50 mm to 100 mm and a height of 800 mm to 1,000 mm and the packing material had a pore size of 500 Å to 1,000 Å. The effluent oil was added to a chromatographic column packed with a cation-exchange resin (with PMMA as a skeleton and introduced with sulfonyl) and an anion-exchange resin (with PMMA as a skeleton and introduced with quaternary amino), and effluent oil was collected, where, a gel column had a diameter of 10 mm to 20 mm and a height of 500 mm to 1,000 mm. The effluent oil was added to a high-pressure reactor, nitrogen replacement was conducted 3 times and then nitrogen was introduced to increase a pressure to 3 MPa, a temperature was raised to 435° C., and then thermal treatment was conducted for 10 h under uniform stirring to obtain an MP with 99% wide-watershed linear optical anisotropy (softening point: 280° C., H/C: 0.50, and carbon residue: 81.95%), where, gas was produced during the reaction, the pressure in the reactor remained stable, and the pressure was released and the temperature was slowly reduced after the reaction was completed. (2) The MP was subjected to melt spinning, pre-oxidation, carbonization, and graphitization to obtain an HMCF (423 GPa).

Example 4

(1) 20 g of ET was taken and prepared into a solution with a mass fraction of 5% using THF as a solvent, the solution was added to a chromatographic column packed with PS, and the top of the column was pressurized to obtain effluent oil, where, a gel column had a diameter of 50 mm to 100 mm and a height of 800 mm to 1,000 mm and the packing material had a pore size of 500 Å to 1,000 Å. The effluent oil was added to a chromatographic column packed with a cation-exchange resin (with styrene-diethylene copolymer as a skeleton and introduced with sulfonyl) and an anion-exchange resin (with styrene-diethylene copolymer as a skeleton and introduced with quaternary amino), and effluent oil was collected, where, a gel column had a diameter of 10 mm to 20 mm and a height of 500 mm to 1,000 mm. The effluent oil was added to a high-pressure reactor, nitrogen replacement was conducted 3 times and then nitrogen was introduced to increase a pressure to 6 MPa, a temperature was raised to 460° C., and then thermal treatment was conducted for 12 h under uniform stirring to obtain an MP with 99% wide-watershed linear optical anisotropy (softening point: 270° C., H/C: 0.52, and carbon residue: 81.35%), where, gas was produced during the reaction, the pressure in the reactor remained stable, and the pressure was released and the temperature was slowly reduced after the reaction was completed. (2) The MP was subjected to melt spinning, pre-oxidation, carbonization, and graphitization to obtain an HMCF (429 GPa).

What is claimed is:

1. A preparation method of mesophase pitch (MP), comprising the following steps:
   (1) separating components with a relative molecular mass of 400 to 1,000 from a heavy oil raw material through size-exclusion chromatography (SEC);
   (2) subjecting the components obtained in step (1) to ion-exchange chromatography (IEC), wherein, the components are passed through a cation-exchange resin and an anion-exchange resin in sequence to obtain modified feedstock oil; and
   (3) subjecting the modified feedstock oil obtained in step (2) to a thermal polycondensation and a first carbonization to obtain the MP; wherein
   a packing material used for the SEC is an organogel, and the organogel is one selected from the group consisting of polystyrene (PS), polyvinyl acetate (PVA), cross-linked dextran, and cross-linked polyacrylamide (CL-PAM), a flushing agent used for the SEC is one selected from the group consisting of hexane, tetrahydrofuran (THF), dichloromethane (DCM), dioxane, cyclohexane, and dichloroethane (DCE);
   resins used for the IEC are at least one selected from the group consisting of PS, polyethylene (PE), polymethyl methacrylate (PMMA), and styrene-diethylene copolymer, the cation-exchange resin is introduced with sulfonyl or carboxyl, the anion-exchange resin is introduced with quaternary amino or tertiary amino;
   the thermal polycondensation is conducted as follows: adding the modified feedstock oil to a high-pressure reactor, and subjecting the modified feedstock oil to a thermal treatment for 1 h to 15 h in an inert atmosphere under the following conditions to obtain the MP: a reaction temperature: 360° C. to 480° C., a reaction pressure: 0 MPa to 10 MPa, and a uniform stirring.

2. The preparation method of the MP according to claim 1, wherein the heavy oil raw material is at least one selected from the group consisting of petroleum atmospheric residue, petroleum vacuum residue, petroleum heavy distillate oil, medium- and low-temperature coal tar heavy components, high-temperature coal tar distillate, catalytic cracking slurry oil, hydrocracking tail oil, and ethylene tar (ET).

3. The preparation method of the MP according to claim 1, wherein the organogel is the PS; the flushing agent used for the SEC is the THF; the packing material has a pore size of 500 Å to 1,000 Å; and a gel column used for the SEC has a diameter of 50 mm to 100 mm and a height of 800 mm to 1,000 mm.

4. The preparation method of the MP according to claim 1, wherein the resins used for the IEC are styrene-diethylene copolymer; the cation-exchange resin is introduced with the sulfonyl; the anion-exchange resin is introduced with the quaternary amino; and a packed column used for the IEC has a diameter of 10 mm to 20 mm and a length of 500 mm to 1,000 mm.

5. The preparation method of the MP according to claim 1, wherein the modified feedstock oil has an N content of less than 0.5%, an S content of less than 0.3%, and a molecular weight distribution (MWD) of 400 to 1,000.

6. The preparation method of the MP according to claim 1, wherein the MP has a softening point of 230° C. to 350° C., a mesophase content of greater than 98%, an H/C ratio of 0.45 to 0.60, and a carbon residue of 80% to 85%.

7. MP, wherein the MP is prepared by the preparation method according to claim 1.

8. A preparation method of a high modulus carbon fiber (HMCF), comprising: subjecting the MP prepared by the preparation method according to claim 1 to a melt spinning, a pre-oxidation, a second carbonization, and a graphitization to obtain the HMCF with a tensile modulus greater than 410 GPa and a tensile strength greater than 2.2 GPa.

9. Use of the MP prepared by the preparation method according to claim 1 in a preparation of high-performance carbon materials, wherein the high-performance carbon materials comprise HMCFs, mesocarbon microbeads (MCMBs), anode materials for lithium-ion secondary batteries, MP-based carbon foam, needle coke, and high-density and high-strength C/C composite materials.

10. The use according to claim 9, wherein the high-performance carbon materials are the HMCFs or the needle coke.

11. The MP according to claim 7, wherein the heavy oil raw material is at least one selected from the group consisting of petroleum atmospheric residue, petroleum vacuum residue, petroleum heavy distillate oil, medium- and low-temperature coal tar heavy components, high-temperature coal tar distillate, catalytic cracking slurry oil, hydrocracking tail oil, and ethylene tar (ET).

12. The MP according to claim 7, wherein the organogel is the PS; the flushing agent used for the SEC is the THF; the packing material has a pore size of 500 Å to 1,000 Å; and a gel column used for the SEC has a diameter of 50 mm to 100 mm and a height of 800 mm to 1,000 mm.

13. The MP according to claim 7, wherein the resins used for the IEC are styrene-diethylene copolymer; the cation-exchange resin is introduced with the sulfonyl; the anion-exchange resin is introduced with the quaternary amino; and a packed column used for the IEC has a diameter of 10 mm to 20 mm and a length of 500 mm to 1,000 mm.

14. The MP according to claim 7, wherein the modified feedstock oil has an N content of less than 0.5%, an S content of less than 0.3%, and a molecular weight distribution (MWD) of 400 to 1,000.

15. The MP according to claim 7, wherein the MP has a softening point of 230° C. to 350° C., a mesophase content of greater than 98%, an H/C ratio of 0.45 to 0.60, and a carbon residue of 80% to 85%.

16. The preparation method of the HMCF according to claim 8, wherein the heavy oil raw material is at least one selected from the group consisting of petroleum atmospheric residue, petroleum vacuum residue, petroleum heavy distillate oil, medium- and low-temperature coal tar heavy components, high-temperature coal tar distillate, catalytic cracking slurry oil, hydrocracking tail oil, and ethylene tar (ET).

17. The preparation method of the HMCF according to claim 8, wherein the organogel is the PS; the flushing agent used for the SEC is the THF; the packing material has a pore size of 500 Å to 1,000 Å; and a gel column used for the SEC has a diameter of 50 mm to 100 mm and a height of 800 mm to 1,000 mm.

18. The preparation method of the HMCF according to claim 8, wherein the resins used for the IEC are styrene-diethylene copolymer; the cation-exchange resin is introduced with the sulfonyl; the anion-exchange resin is introduced with the quaternary amino; and a packed column used for the IEC has a diameter of 10 mm to 20 mm and a length of 500 mm to 1,000 mm.

19. The preparation method of the HMCF according to claim 8, wherein the modified feedstock oil has an N content of less than 0.5%, an S content of less than 0.3%, and a molecular weight distribution (MWD) of 400 to 1,000.

20. The preparation method of the HMCF according to claim 8, the MP has a softening point of 230° C. to 350° C., a mesophase content of greater than 98%, an H/C ratio of 0.45 to 0.60, and a carbon residue of 80% to 85%.

\* \* \* \* \*